STOCK QUOTATION SWITCHING SYSTEM UTILIZING SWITCHING MEANS FOR ALTERNATING THE CONNECTION OF A REGISTER AND ITS ASSOCIATED TRUNK

Filed Dec. 24, 1963 7 Sheets-Sheet 1

INVENTOR
G. RIDDELL
BY
A. C. Winter
ATTORNEY

STOCK QUOTATION SWITCHING SYSTEM UTILIZING SWITCHING MEANS
FOR ALTERNATING THE CONNECTION OF A REGISTER
AND ITS ASSOCIATED TRUNK

Filed Dec. 24, 1963 7 Sheets-Sheet 2

STOCK QUOTATION SWITCHING SYSTEM UTILIZING SWITCHING MEANS FOR ALTERNATING THE CONNECTION OF A REGISTER AND ITS ASSOCIATED TRUNK

Filed Dec. 24, 1963

STOCK QUOTATION SWITCHING SYSTEM UTILIZING SWITCHING MEANS FOR ALTERNATING THE CONNECTION OF A REGISTER AND ITS ASSOCIATED TRUNK

Filed Dec. 24, 1963

STOCK QUOTATION SWITCHING SYSTEM UTILIZING SWITCHING MEANS FOR ALTERNATING THE CONNECTION OF A REGISTER AND ITS ASSOCIATED TRUNK

Filed Dec. 24, 1963

Oct. 17, 1967 G. RIDDELL 3,347,989

STOCK QUOTATION SWITCHING SYSTEM UTILIZING SWITCHING MEANS FOR ALTERNATING THE CONNECTION OF A REGISTER AND ITS ASSOCIATED TRUNK

Filed Dec. 24, 1963 7 Sheets-Sheet 7

United States Patent Office 3,347,989

Patented Oct. 17, 1967

3,347,989

STOCK QUOTATION SWITCHING SYSTEM UTILIZING SWITCHING MEANS FOR ALTERNATING THE CONNECTION OF A REGISTER AND ITS ASSOCIATED TRUNK

George Riddell, Lincroft, N.J., assignor to Bell Telephone Laboratories, Incorporated, New York, N.Y., a corporation of New York Filed Dec. 24, 1963, Ser. No. 333,000
16 Claims. (Cl. 179—6)

ABSTRACT OF THE DISCLOSURE

In a switching network, arranged to provide subscriber access to a computer controlled voice answer back unit, registers are provided to accept address codes transmitted by the subscribers, while trunks each exclusively associated with a register, are provided to return the audible announcement. Each register and the associated trunk are controlled by a switching circuit which alternates connection of the trunk and register to a pair of channels to permit the trunk to transmit the desired information back to a first subscriber, while the associated register simultaneously registers a new address code from a second subscriber.

Figure 1:
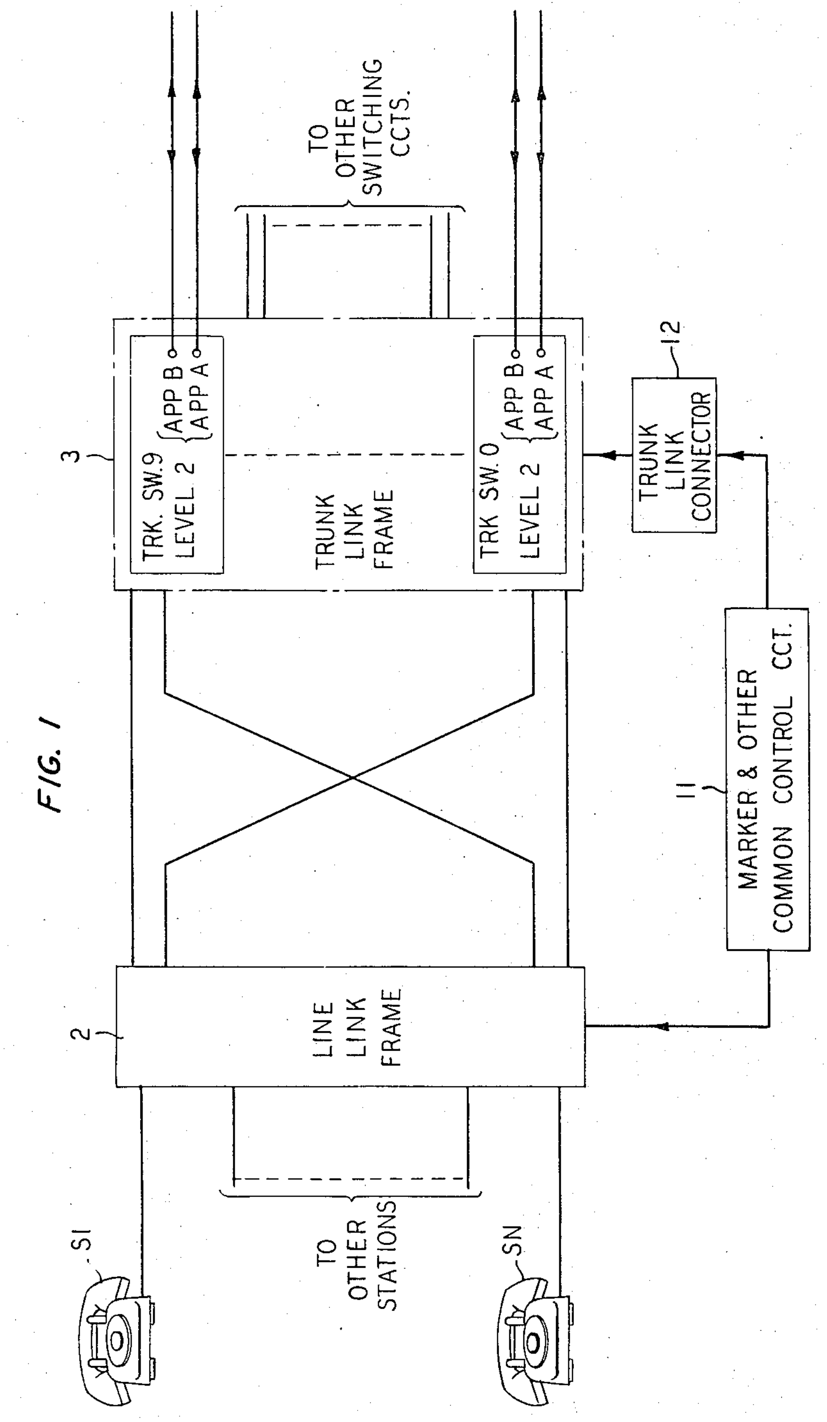

This invention relates generally to automatic switching systems operable to complete calling connections which are characterized by a high calling rate and relatively uniform holding time. The invention particularly relates to switching equipment in such systems which automatically transfers a channel, over which control signals have been received, from a signal receiving device to an associated trunk circuit over which information is transmitted in response to such signals, and thereupon associates the signal receiving device with another channel whereupon the same procedure may be repeated.

Extensive development and improvement of telephone switching systems in recent years has resulted in greater reliance being placed upon the ability of such systems to facilitate the everyday business needs of telephone customers. In this regard, seemingly unrelated expansion in another field quite often leads to demand for an improved switching system. Almost inevitably, two main factors lead the requirements for such improvement; namely: increased speed of operation and continued economy of implementation.

In the past decade there has been a significant increase in participation by the public in the purchase and sale of securities on the various stock exchanges. Concurrent therewith, in keeping with an expanding economy, there has been a significant increase in the number and type of securities offered by such exchanges. A natural result of these two factors has been an increase in the number of stockbrokers, who function as the intermediaries between the buyers and sellers of the securities offered on the various exchanges. In their capacity as intermediaries it is necessary for such brokers to have immediate and accurate price information regarding commodities which in many instances fluctuate widely and frequently in price during the course of a business day.

Telephone stock-quotation systems have been provided in the past to enable such brokers to dial a predetermined code and receive in response thereto an audible announcement stating the pertinent price information for a specific stock as identified by the dialed code. Simply stated, such systems comprise a subscriber controlled switching network operable to connect such subscribers with voice-answer-back equipment.

It will be noted that the traffic through such a switching system differs from conventional telephone traffic in many aspects. For example, in the usual telephone switching system, traffic is distributed over a 24-hour period with relatively brief "busy hour" peaks. In addition, each connection is maintained after establishment for a period averaging several minutes in duration. However, in the case of stock quotation systems all traffic is concentrated within the business day. Further, in stock quotation systems, an established connection is maintained only long enough to receive the required information, a matter of perhaps five to ten seconds. Therefore, when these factors are added to a situation comprising an expanding number of brokers, an expanding number of stocks, and a higher calling rate based upon large volume, it is clear that improved system arrangements must be provided which are operative to meet such requirements.

It is, of course, obvious that an arrangement which satisfies the need in stock quotation systems would also be applicable to other systems having similar requirements, such as those which provide secretarial answering service, airline reservation service, time of day service and weather information service.

Accordingly, it is an object of this invention to provide a switching arrangement which is effective to increase the traffic handling capacity of a switching system without increasing the complexity of associated control equipment.

It is another object of this invention to increase the speed at which connections within switching systems are established.

It is a further object of this invention to utilize switching system trunk and register equipment to their respective maximum efficiency.

It is another object of this invention to provide a switching system wherein a high calling rate and low holding time requirement does not present an economic disadvantage as to the equipment required thereby.

These and other objects are attained in accordance with an exemplary embodiment of the invention in a stock quotation system wherein a privileged broker, by dialing an appropriate code, is enabled to interrogate a computer which, in turn, controls a voice-answer-back unit operable to return an audible manifestation of the required stock information. Each of the privileged stations is terminated on the originating side of a switching network, and has immediate access to a plurality of registers which appear on the terminating side of the network. The registers are operable to receive and register the stock identifying code transmitted from the station, and each register is paired with an associated trunk unit operable to convey the audible stock announcement from the computer to the station. A switching circuit is interposed between each trunk-register pair and a pair of switching network appearances on the terminating side of the switching network. The trunk and register in a pair are each individually connected through the switching circuit to one of the appearances.

Upon a request for service from a privileged station, a connection is established through a switching circuit to an idle register associated therewith. When dialing is completed, the register forwards the dialed information to a sender which, in turn, activates the computer. The computer assembles the required information, and having done so, signals the switching circuit via the trunk associated with the register serving the call.

The switching circuit thereupon automatically connects the trunk exclusively to the switching network appearance used for the connection to the register, and concurrently therewith connects the register exclusively to the other appearance of the switching circuit formerly associated with the trunk. The register is thereupon available to receive another dialed code during the interval that an audible announcement is being returned via the associated trunk.

Upon completion of the announcement via the trunk, the register forwards the newly dialed code contained therein as on the previous connection so as to cause the assembly of the required stock data in the computer. And, as on the previous connection, upon receipt of a signal from the computer, the switching circuit causes the trunk to be connected to the appearance used for the latest dial tone connection while the register is reassociated with the appearance formerly connected to the trunk.

Thus, when the register of any register-trunk pair has completed its function, it is immediately utilized to serve another call. In like fashion, when the trunk completes its function, it too becomes immediately available to serve another call. Therefore, during the heavy traffic of the business day, both component halves of a trunk-register unit are simultaneously operating to process calls which progress in opposing directions, i.e., the register is receiving control information from one station while the trunk is returning audible information to another station.

In accordance with one feature of this invention, a switching circuit is provided which automatically alternates the connection of a signal receiving device and a signal forwarding device between a plurality of switching network appearances as determined by the direction of circuit action at each appearance.

In accordance with another feature of this invention, a switching circuit having a plurality of switching network appearances, each operative to convey electrical signals in either of two opposing directions, is provided with equipment operative to recognize the cessation of signaling in one direction and the imminence of signaling in a reverse direction, and to cause the connection of suitable apparatus in response thereto.

In accordance with another feature of this invention, a switching circuit is interposed between a register-trunk pair and two switching network appearances, and is arranged to alternate the connection of the register and the trunk to each of the appearances in a predetermined sequence.

Figures 2, 8:
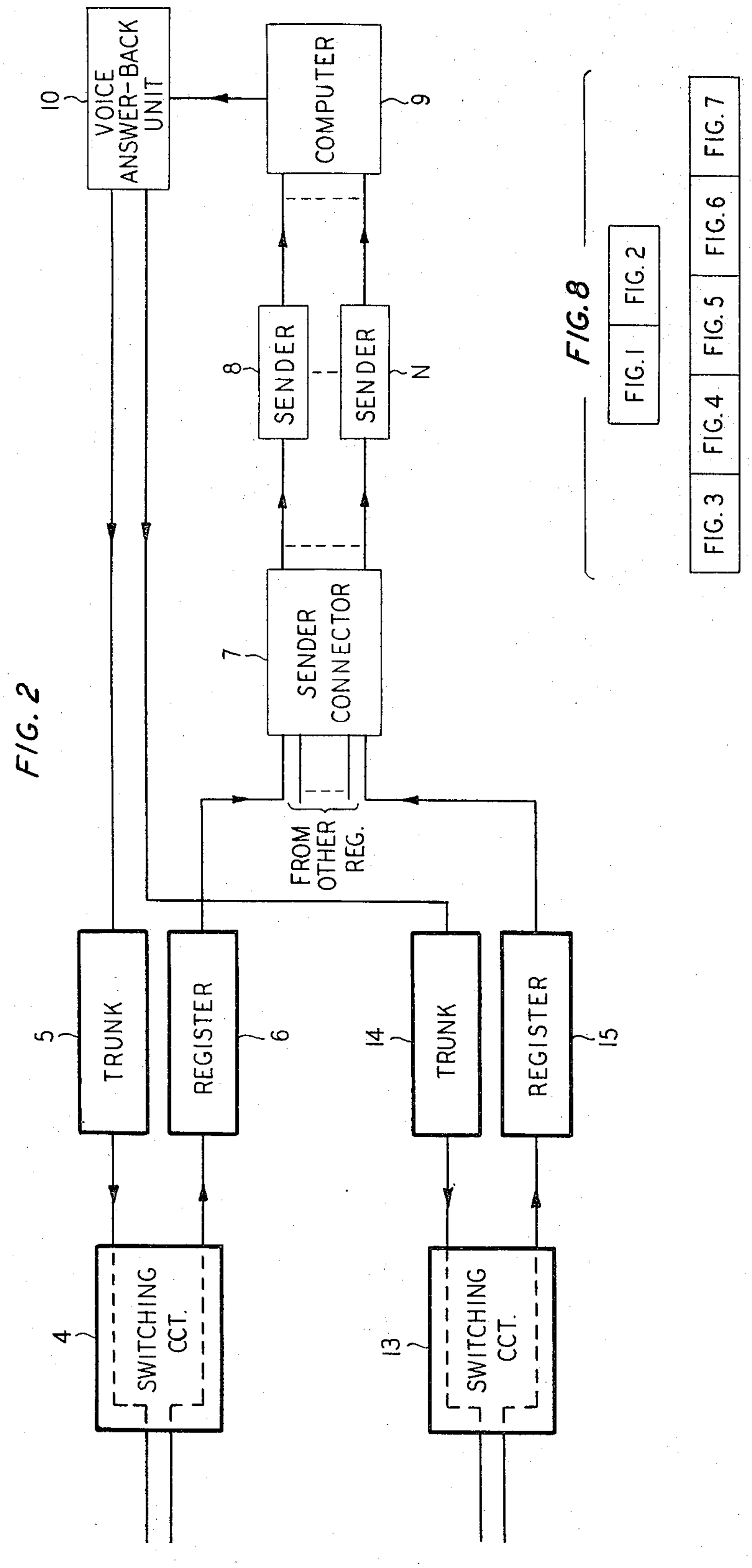

The foregoing objects and features, as well as others, will be more apparent from a consideration of the subsequent description and the drawing, in which:

FIGS. 1 and 2 comprise a block diagram showing the interrelation of the components of the exemplary embodiment;

FIGS. 3 through 7 show in greater detail the interrelation of the components of the exemplary embodiment; and FIG. 8 depicts the position in which the various figures should be placed.

It will be noted that FIGS. 3 through 7 employ a type of notation referred to as "detached-contact" in which an "X," shown intersecting a conductor, represents a normally open contact of a relay, and a bar, shown intersecting a conductor at right angles, represents a normally closed contact of a relay; "normally" referring to the unoperated condition of a relay. The principles of this type of notation are described in an article entitled, "An Improved Detached-Contact-Type Schematic Circuit Drawing," by F. T. Meyer in the September 1955 publication of the American Institute of Electrical Engineers Transactions, Communications and Electronics, vol. 74, pages 505–513.

The present invention may advantageously be embodied in an automatic switching system such as the system disclosed in the A. J. Busch Patent No. 2,585,904, dated Feb. 19, 1952. It is to be understood, however, that the invention is not limited to use in a system of this type, but may be used in any automatic switching system.

The invention described herein is patricularly concerned with apparatus in switching circuits 4 and 13, trunks 5 and 14, and registers 6 and 15 which are represented by the blocks shown with heavy lines in FIG. 2.

The other equipment units are neither shown nor described in detail except where necessary for a complete understanding of the invention.

Computer 9 may be of a type well known in the art which is operative to receive and store numerous bits of information in response to externally applied electrical stimuli and is further operative to provide such stored information electrically upon request. Such computers are discussed in numerous publications; for example, in the "General Information Manual, Introduction to IBM Data Processing Systems," 1960, by International Business Machines Corporation.

Voice-answer-back unit 10 may comprise any number of configurations well known in the art which are operative to return a sequence of audio signals in response to electrical signals; for example, the arrangement described and illustrated in detail in the Mälthaner et al. Patent No. 2,951,908, dated Sept. 6, 1960, may be utilized.

The Busch patent may be consulted for a complete understanding of the construction and operation of all other components which are not covered in detail herein.

The interrelation and functions of equipment units of the exemplary embodiment will now be described with reference to FIGS. 1 and 2 wherein the interconnections between circuit blocks have been designated by means of arrows to show the direction of circuit action.

(1) GENERAL DESCRIPTION (FIGS. 1 AND 2)

For purpose of explanation, we shall assume stations S1 through SN comprise a plurality of privileged stations, all of which are terminated on line link frame 2. It will be clear from that which is contained hereinafter that line link frame 2 is not necessarily restricted to the termination of such privileged stations, but could, in fact, also terminate conventional subscriber lines. It will also be apparent from that which is contained hereinafter that the privileged stations are not restricted to being terminated on a particular line link frame, but rather could, in fact, have their terminations distributed over a plurality of line link frames as dictated by traffic considerations.

We shall assume that a broker at station S1 desires to ascertain the current status of a given stock listed on the Exchange. Upon an off-hook condition of station S1, a dial tone connection is established from station S1 through to an available register, such as register 6, as set forth in detail in the A. J. Busch patent.

As shown on FIG. 1, register 6 appears initially on appearance A, level 2, trunk switch 9. Thus, the crossbar switch channel linkage is extended between the station S1 appearance on line link frame 2 and the above-recited appearance of register 6 on trunk link frame 3.

Upon the receipt of dial tone, a predetermined code which may, for example, comprise four arbitrary digits, is dialed and recorded in register 6. Upon registration of the fourth digit, register 6 recognizes that a complete code identifying a particular stock has been dialed. Register 6 thereupon seizes an available sender, such as sender 8, via sender connector 7. Register 6 then forwards the received four digit stock code and, in addition, forwards a three digit number identifying the trunk with which register 6 is associated, namely trunk 5.

Upon receiving the trunk number and the four digit code, sender 8 forwards this information to computer 9. Computer 9 thereupon processes the request by utilizing the four digit stock number to read out from its memory the information indicating the current status of the stock. The trunk number is used by the computer to cause selection of a corresponding output channel from voice-answer-back unit 10 to trunk 5.

The information received from the computer memory is used to control the voice-answer-back unit, so as to cause the return of an audible announcement via the selected output channel. The audible announcement will indicate, for example, the bid and asked price for the stock. However, immediately prior to enabling the audible announcement, a signal is forwarded over the trunk conductors to switching circuit 4. Switching circuit 4 recognizes from this signal that the computer has received and processed a stock code request and is ready to provide an audible announcement in response thereto. Switching circuit 4 thereupon causes trunk 5 to be transferred from its existing association with appearance B, level 2 of trunk switch 9, to appearance A on the same level; and concurrently therewith to cause register 6 to be transferred from its connection to appearance A to appearance B, formerly associated with trunk 5. Upon the completion of this transfer function, the audible announcement is returned through trunk 5 and over the channel linkage previously used for the dial tone connection to station S1.

Register 6 in its new association with appearance B is rendered immediately available for use on a dial tone connection to another station. Thus, while the audible announcement is being returned to station S1 via trunk 5, register 6 may record another dialed request for stock information.

Upon registration of the dialed code associated with a new request, such as a request from station SN, register 6 bids for a sender in the same fashion as for the prior request from station S1. However, as will be more apparent hereinafter, such connection to a sender is not begun until trunk 5 has completed its function with respect to station S1.

It will be noted at this point that, in general, the interval of time required for an audible announcement stating the bid and asked price is approximately equal to the interval of time required to dial and register four digits. Thus, in practice no time delay of any significance occurs between registration of the dialed stock code and the forwarding of this information to the sender.

Upon receipt of the dialed code information transmitted by station SN, computer 9 processes the information as for the prior call and, as before, switching circuit 4 is advised when the computer is ready to return the audible announcement. Trunk 5 is thereupon reassociated with appearance B, and register 6 is reassociated with appearance A. Therefore, an announcement via trunk 5 may again occur while register 6 receives dialed digits identifying another request. Consequently, during the heavy traffic periods of the business day, both component halves of a trunk-register unit are simultaneously operating to process calls which progress in opposing directions.

(2) DETAILED DESCRIPTION

The manner in which marker 11 functions to establish a dial tone connection between a station appearing on line link frame 2 and a register appearing on trunk link frame 3 is exactly as set forth in detail in the A. J. Busch patent. Accordingly, that portion of the Busch patent, namely, column 6 through column 61, is hereby made a part of this specification as though contained in detail herein.

In order to simplify the drawings, certain relays and relay contact designations have been enclosed by parentheses in order to indicate that the associated winding operate path is shown in detail on the aforesaid Busch patent drawings and is not repeated herein.

Figure 3:
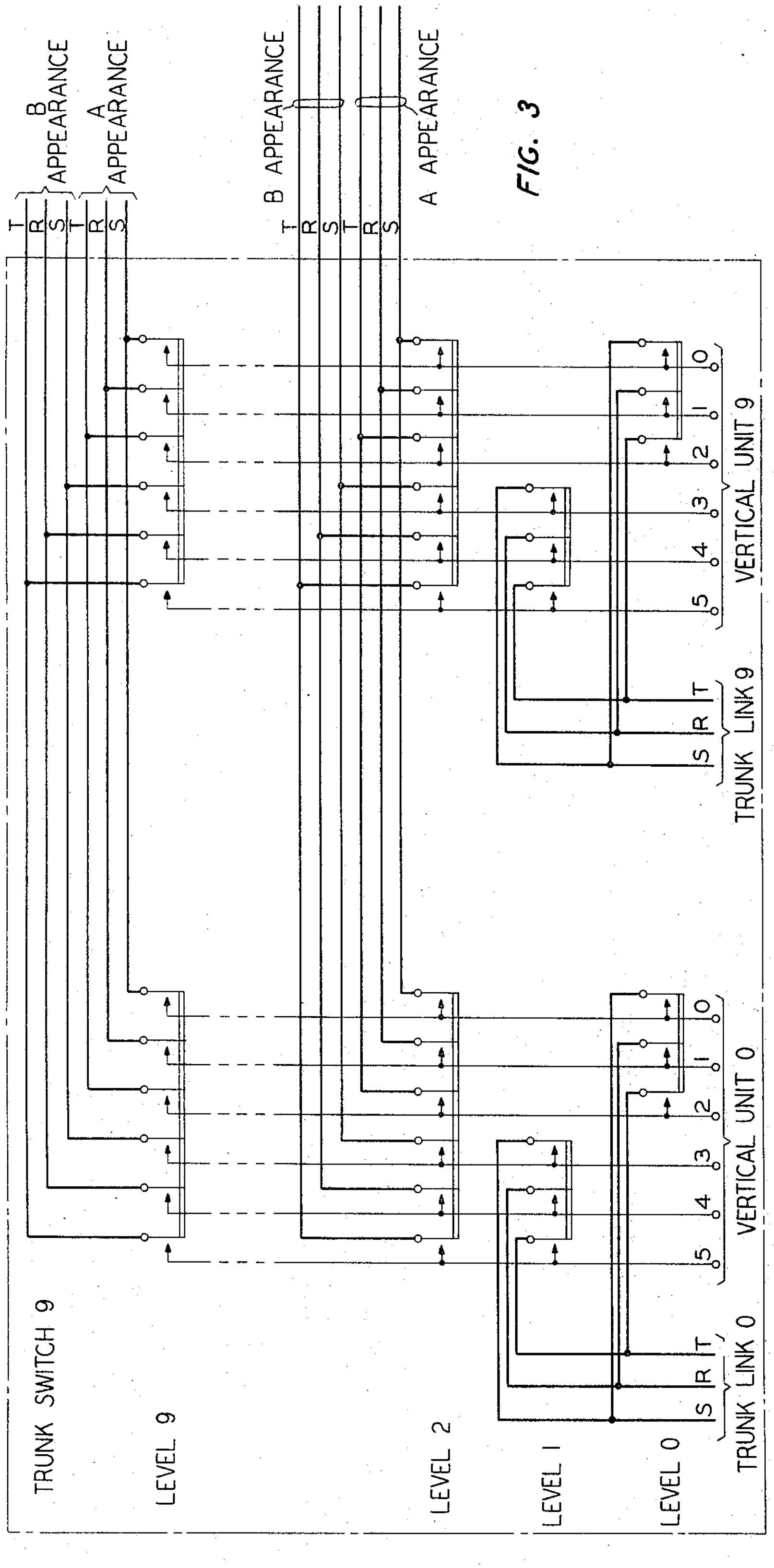
Figure 4:
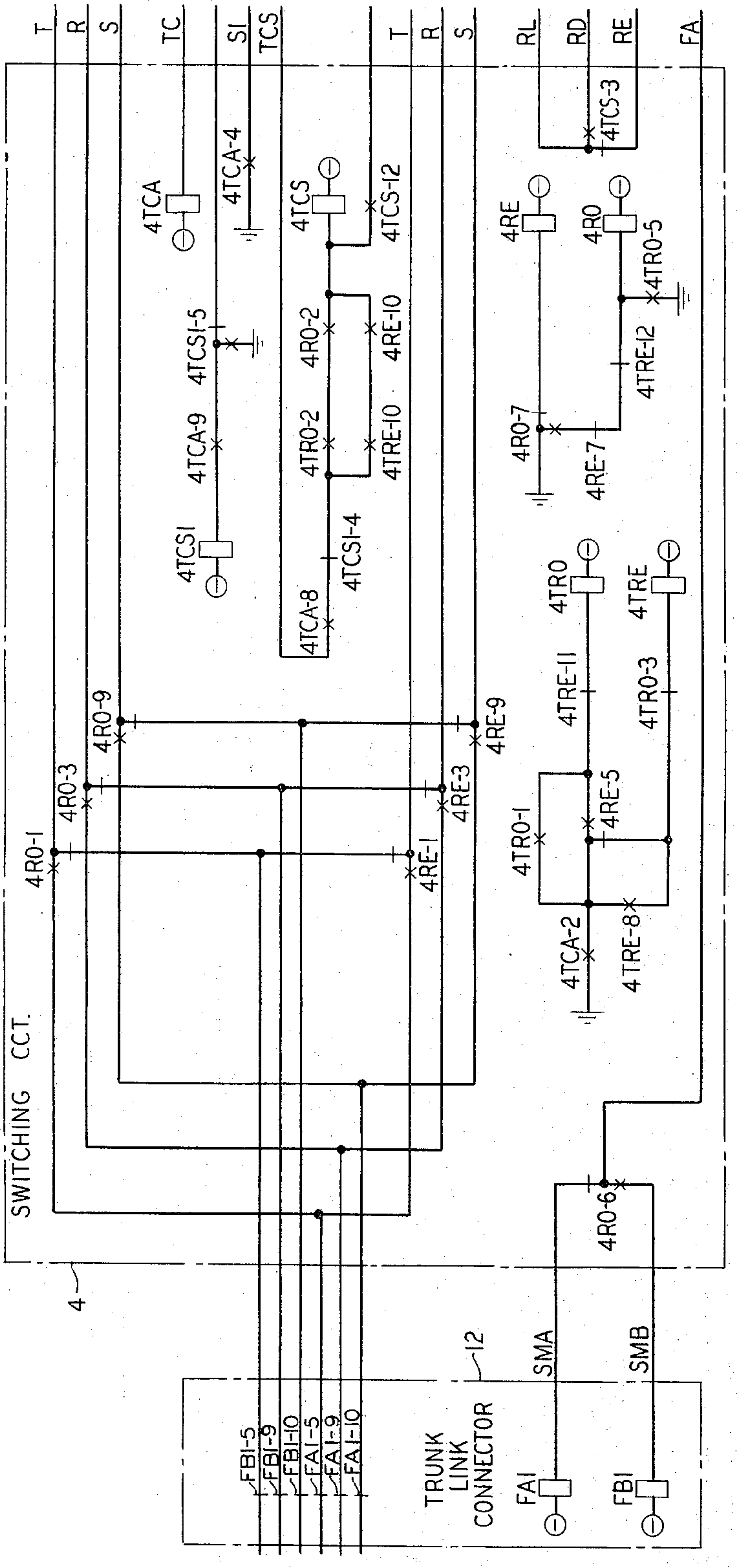

Referring briefly to FIG. 3, it will be noted that trunk switch 9 is arranged as described in the Busch patent so as to terminate a total of 16 registers or trunk circuits. This is accomplished by subdividing each of the trunk switch levels 2 through 9 into distinct A and B appearances wherein each appearance terminates a separate circuit. Each such circuit is then connectable to a given trunk link by the closure of two crosspoints in the same trunk switch vertical unit, i.e., a crosspoint at either level "0" or level "1" plus a crosspoint at one of levels 2 through 9.

This arrangement of providing an A and a B appearance for a particular switch level may advantageously be utilized to facilitate an explanation of one embodiment of the invention. However, it will be apparent from the following description that the invention is not dependent on such an arrangement.

(2.1) *Establishing the dial tone connection*

Referring now to FIGS. 3 through 7, it will be recalled, as set forth in detail beginning in column 9 of the Busch patent, that an operated FA1 or FB1 relay in trunk link connector 12 determines the A or B appearance, respectively, to be used on a given connection. Upon selection of register 6 by marker 11, relay (F) (not shown) is operated in register 6. Ground is thereupon extended through contact (F–5), FIG. 5, over the FA lead from register 6 to switching circuit 4, and thence through break contact 4RO–6 released, via the SMA lead so as to operate relay FA1 in trunk link connector 12. Relay FA1 accordingly operates at this time and, as set forth in the Busch patent, subsequently causes the enabling of the A appearance of level 2 on trunk switch 9.

When channel selection for the dial tone connection has been completed and the marker is ready to turn supervision of the connection over to the register as set forth in column 56 of the Busch patent, relay (F) is caused to release in register 6. Accordingly, relay FA1 releases by an obvious circuit thereby extending the T, R, and S leads from the A appearance on trunk switch 9, level 2, through break contacts FA1–5, FA1–9, and FA1–10, respectively, to switching circuit 4. From switching circuit 4 these leads are extended through enabled transfer contacts 4RE–1, 4RE–3, and 4RE–9 to register 6 where the T and R conductors terminate in the secondary windings of transformer TN and the S conductor is extended through make contact (ON–2) to ground.

At this point a dial tone connection has been completed comprising a communications channels extending from calling station S1 through to register 6. Register 6 may advantageously be arranged similar to the originating register described in the Busch patent except as hereinafter noted.

Figure 5:
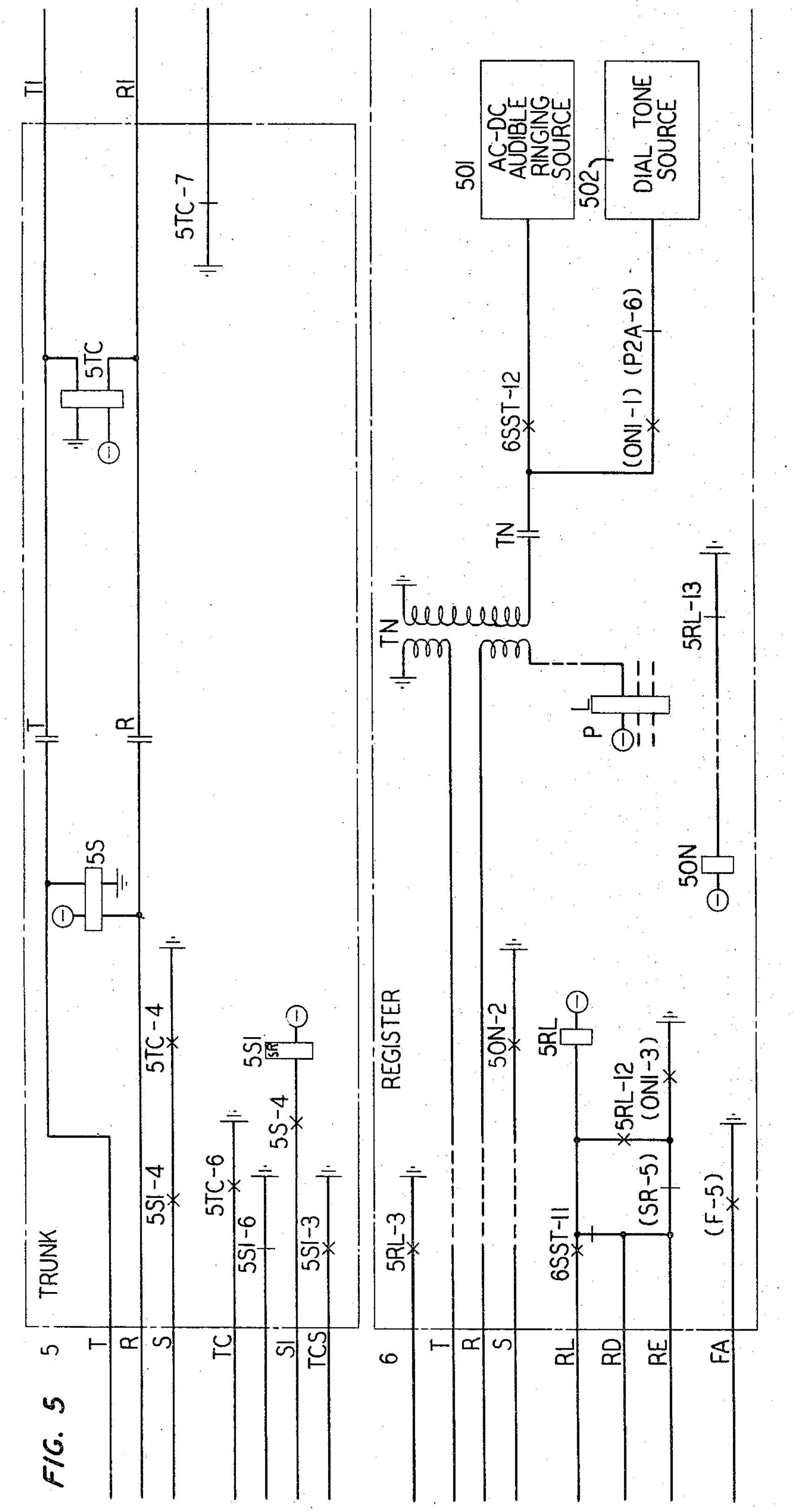
Figure 6:
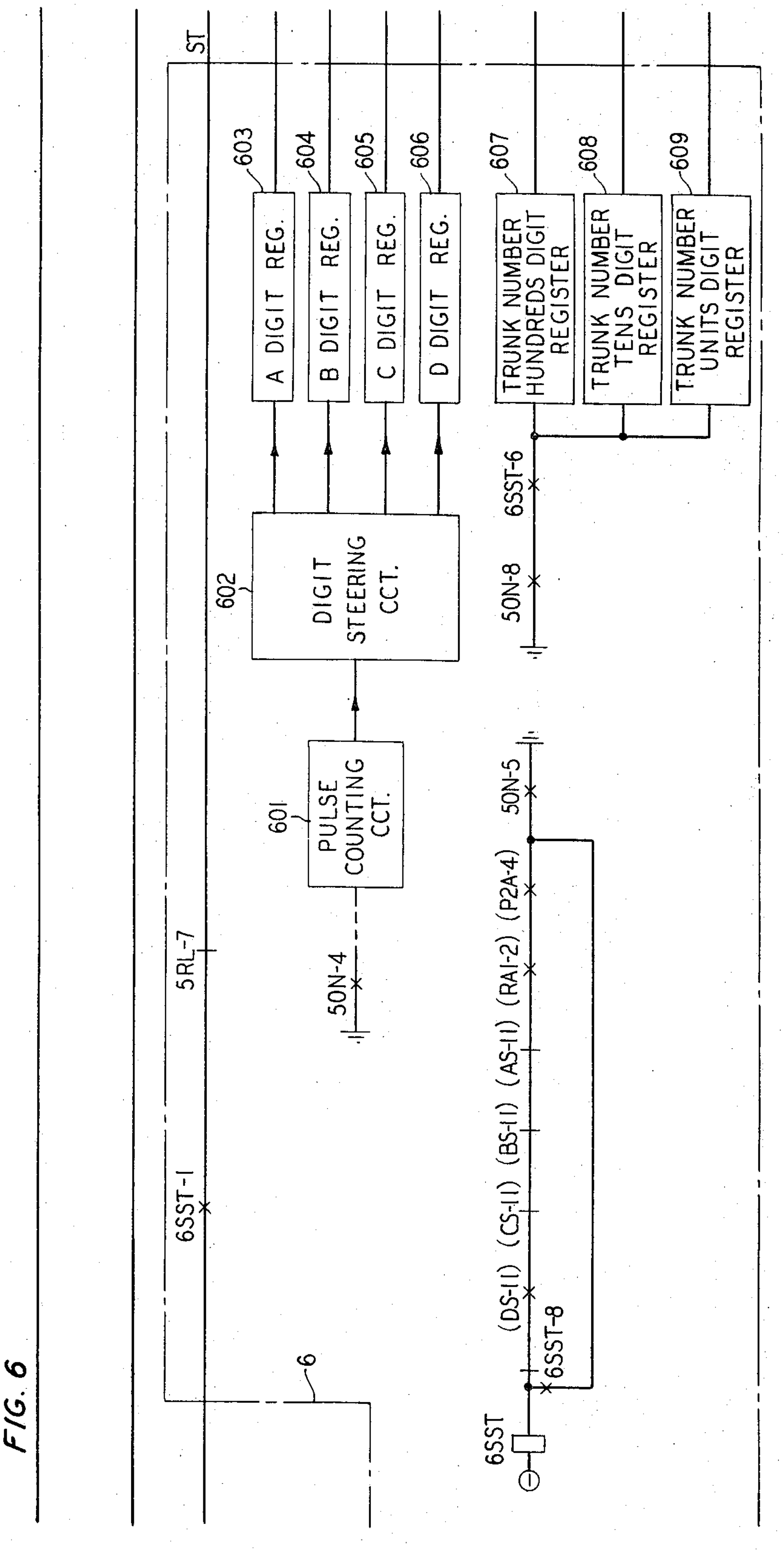

The enabling of make contact (ON1–1) and the released condition of (P2A–6) in register 6, FIG. 5, enables dial tone source 502 so as to impress dial tone through transformer TN to the T and R conductors of the A appearance.

(2.2) *Registration of information in register*

Upon the receipt of dial tone, the party at station S1 commences dialing. As set forth in the Busch patent, the dial pulses are repeated by register relay L, FIG. 5, and are counted and stored by circuitry represented in FIG. 6 by pulse counting circuit 601, digit steering circuit 602, and A through D digit registers 603 through 606, respectively.

As described in detail in the Busch patent, at the completion of dialing of a fourth digit, relays (CS), (BS), and (AS) are in a released state and relays (DS), (RA1), (P2A) and 5ON are in an operated state. Accordingly, upon receipt of the fourth digit, relay 6SST operates via an obvious circuit comprising contacts on these relays as an indication that the required four digits identifying the stock have been received. Enabled make contact 6SST–12 enables an audible ringing source 501, thus impressing a ringing tone on the primary winding of transformer TN as a signal to the calling station that the call is being completed. The enabling of make contact 6SST–6 extends positive ground present on the 5ON–8 contacts to the trunk number hundreds, tens, and units registers 607 through 609, respectively. Registers 607 through 609 may advantageously comprise a number of configurations well known in the art such that, upon application of a ground signal, a predetermined number will be manifested at the output on a two-out-of-five digital basis. In the instant case the particular hundreds, tens, and units numbers comprise the number 005 to indicate the identity of the trunk associated with register 6.

(2.3) *Seizure of sender*

The enabling of make contact 6SST–1 extends ground from released break contact 5TC–7 in trunk 5 through 5RL–7 released, via the ST lead, so as to operate the sender connector start relay 7RS6. Relay 7RS6 enables the sender connector relays (RD) and (MD) which may advantageously be arranged and controlled in the same fashion as the correspondingly designated originating register marker connector relays described in detail in the Busch patent. Thus, upon the enabling of the (RD) and (MD) relays, a plurality of information and control leads are extended between register 6 and an available sender such as sender 8.

Sender 8 may be arranged, as well known in the art, to receive and register digital information from register 6 and to provide in response thereto a signal output compatible with the input apparatus arrangement of computer 9. Thus, the four digit code information from register 6 is registered on the A through D digit register 701 in sender 8. In similar fashion the trunk number hundreds, tens, and units register 702 in sender 8 records the assigned number of the trunk associated with register 6.

(2.4) *Enabling voice-answer-back unit 10*

Upon completion of registration in the sender, this information is translated as required by translator 703 and forwarded through signal transmitter 704 to input storage circuit 705 in computer 9. The information representing the dialed four digit stock code is thereupon utilized by memory read control circuit 706 to read from stock information memory circuit 707 the required data which then is temporarily stored in memory output storage circuit 708.

(2.5) *Seizing the trunk associated with register*

The three digit trunk number enables voice-answer-back output control circuit 709 to select the output channel in voice-answer-back unit 10 which corresponds to trunk 5.

Figure 7:
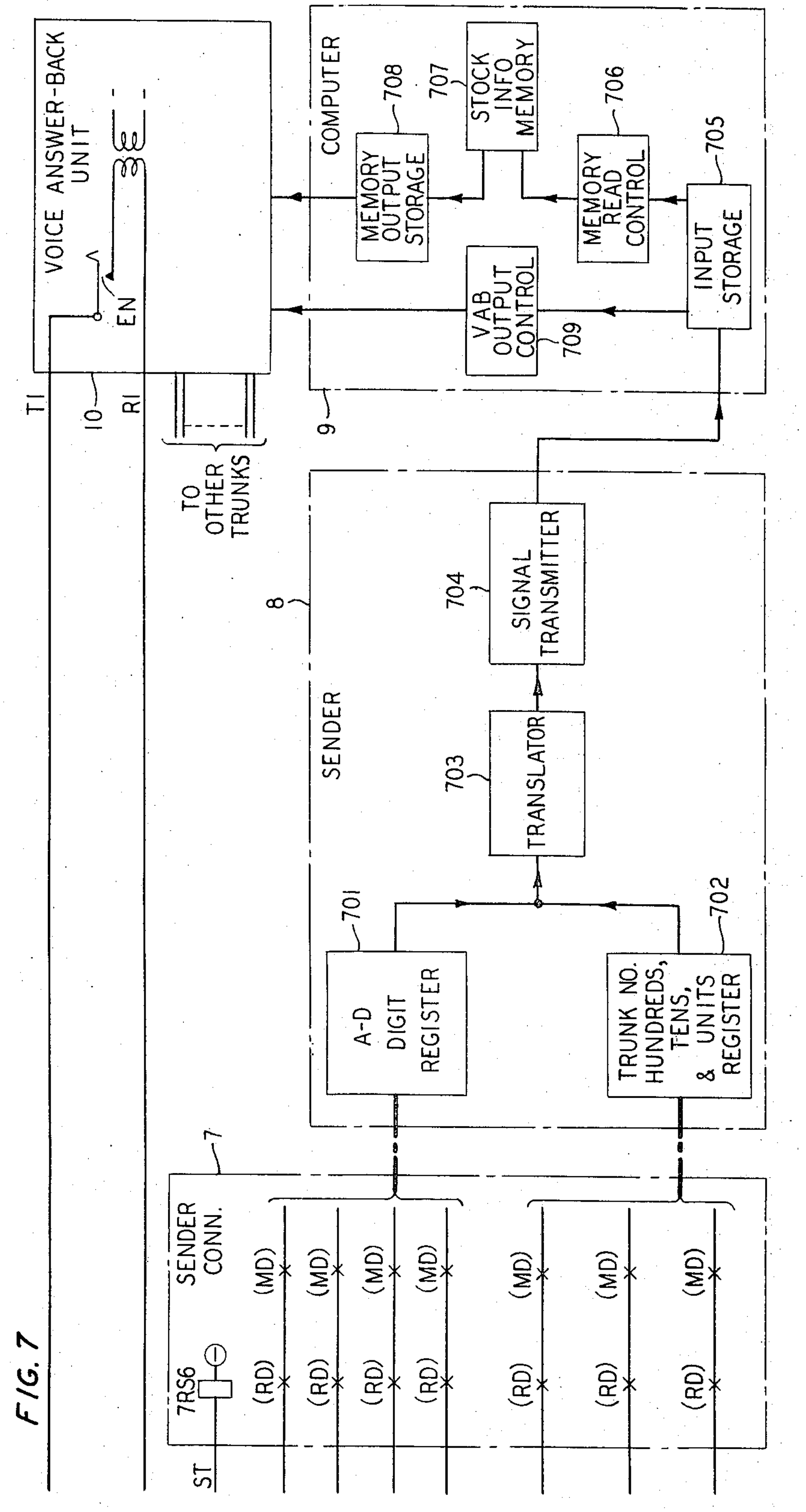

Upon selection of the appropriate output channel, as manifested by leads T1 and R1 in FIG. 7, voice-answer-back unit 10 enables trunk 5 by closing the T1 and R1 leads together in a manner well known in the art through apparatus symbolically represented by manually operable key EN. Accordingly relay 5TC in trunk circuit 5 operates at this time by an obvious circuit.

(2.6) *Enabling switching circuit 4*

The operation of make contact 5TC–6 extends ground over the TC lead from the trunk to enable relay 4TCA in switching circuit 4. The operation of make contact 4TCA–2 enables relay 4TRO by extending ground through 4RE–5 operated, 4TRE–11 released, through the winding of the 4TRO relay to battery. Accordingly, relay 4TRO operates. The operation of make contacts 4TRO–5 thereupon operates relay 4RO by an obvious circuit. Enabled break contact 4RO–7 causes the release of the previously operated relay 4RE. It may be noted at this time that relays 4RE and 4RO control the connection of the register and trunk to the A and B appearances. It should be further noted that the operation of either relay inhibits the operation of the other.

The enabling of transfer contacts 4RO–1, 4RO–3, 4RO–9 transfer the trunk T, R, and S leads from the B appearance of level 2, trunk switch 9, to the A appearance of level 2 of trunk switch 9. Concurrently therewith, the release of transfer contacts 4RE–1, 4RE–3, and 4RE–9 transfer the T, R, and S conductors of register 6 from the A appearance of level 2, trunk switch 9, to the associated B appearance.

When the trunk T and R conductors are connected to the correspondingly designated conductors of the A appearance, relay 5S operates by a circuit which extends over the communications path to the calling station. Relay 5S1 operates at this time via a circuit which extends through 5S–4 and 4TCA–4 to ground. Ground is thereupon extended over the trunk S lead through 5S1–4 and 5TC–4 to maintain the communications channel as set forth in the Busch patent. The announcement from voice-answer-back unit 10 is thus transmitted to the customer at station S1 through trunk 5 via the linkage previously used for the dial tone connection.

(2.7) *Reseizure of register 6*

Concurrently with the start of the audible announcement via trunk 5, register 6 is rendered available for reseizure via the B appearance of level 2, trunk switch 9.

Assuming that such subsequent seizure occurs, relay (F) is operated as hereinbefore described and extends ground via the FA lead from register 6 to switching circuit 4. However, since trunk 5 is currently associated with the A appearance, relay 4RO is enabled as previously described. Thus, the ground provided on the FA lead is extended so as to operate relay FB1 at this time. Accordingly, a dial tone connection is established to another station, such as station N (FIG. 1), as hereinbefore described with the single exception that, by virtue of the operated state of relay FB1, such connection is established via the level 2 B appearance of trunk switch 9.

Dial tone is returned as before and, upon recipt of the stock-identifying digits, a sender is seized. When the computer receives the required information from the sender, trunk 5 is enabled as described earlier.

The subsequent reoperation of relay 4TCA in switching circuit 4 operates relay 4TRE by a circuit path extending from ground through 4TCA–2 operated, 4RE–5 released, 4TRO–3 released, through the 4TRE relay winding to battery. Enabled break contact 4TRE–12 releases the previously operated relay 4RO by an obvious circuit. Relay 4RE is thereupon operated by a circuit extending to ground through 4RO–7 released. Relay 4TRE is subsequently released via normal make contact 4TCA–2 when the trunk restores to normal.

The release of relay 4RO reassociates the T, R, and S leads of trunk 5 with the trunk link frame B appearance via released break contacts 4RO–1, 4RO–3, and 4RO–9, respectively. In similar fashion enabled make contacts 4RE–1, 4RE–3, and 4RE–9 reassociate register 6 with the A appearance.

Thus, as on the previous call, the audible announcement is returned over trunk 5 via the appearance used for the dial tone connection. And, as described earlier, register 6 is again rendered available to serve another customer via the trunk link from A appearance.

(2.8) *Release of the register*

Register release in the case of a partial dial or in the case of an abandoned call proceeds exactly as set forth in detail in the A. J. Busch patent. Assuming, however, that the call progresses through the register as hereinbefore described, when switching circuit 4 is enabled the register is caused to release. The register release relay 5RL is operated by negative battery which extends through the 5RL winding, through operated make contact 6SST–11, via the RL lead to switching circuit 4, operated make contact 4TCS–3, via the RD lead to register 6, through (SR–5) released, and 5ON–3 operated to ground. Relay 5RL thereupon locks operated by an obvious circuit which extends through make contact 5RL–12. The enabling of break contact 5RL–13 releases relay 5ON in register 6. The release of relay 5ON removes ground from the register S conductor and releases all other previous operated register relays as set forth in the Busch patent thereby restoring the register to normal.

(2.9) *Trunk release*

In the event that a customer abandons the call prior to completion of the audible announcement, relay 5S releases due to the opening of the loop toward the associated station. Relay 5S1 accordingly releases by an obvious circuit. The release of make contact 5S1–4 removes ground from the S conductor thereby restoring the channel linkage to normal as set forth in detail in the Busch patent. In similar fashion relay 4TCS is released by the release of make contact 5S1–3.

When the announcement is completed, the T1 and R1 conductors from the voice-answer-back unit to the trunk are opened. Relay 5TC accordingly releases thereby restoring relay 4TCA to normal. Relay 4TCA, in turn, causes the release of relays 4TCS1 and either relay 4TRO or relay 4TRE. Accordingly, trunk 5 in switching circuit 4 is restored to normal. Only one relay in switching circuit 4 remains in an operated condition. This relay being either relay 4RE or 4RO depending upon which of these two relays is in an operated state at the time of the trunk release.

In the event the computer disconnects prior to abandonment of the call by the calling station, relay 5TC is restored to normal thereby removing ground from the trunk S conductor, thus causing the release of 5S and the subsequent restoration to normal of trunk 5 and switching circuit 4 as hereinbefore described.

(2.10) *Conclusion*

While the equipment of this invention has been described with reference to a particular embodiment in a telephone stock quotation system, it is to be understood that such an embodiment is intended merely to be illustrative of the present invention, and that numerous other arrangements may be devised by those skilled in the art without departing from the spirit and scope of the invention.

For example, the invention may be employed where a plurality of subordinate computers require the ability to interrogate a main computer at random intervals.

Another example would be where the invention is employed with a computer which is further arranged to return information in a plurality of categories such as time, weather, traffic, etc. as determined in each instance by the dialed request.

Another example would be where the invention is employed to enable a telephone customer to verify information previously stored in a central memory device.

Another example would be where the invention is employed to inform a telephone customer of the changed status of a directory number in response to the dialing of such directory number.

What is claimed is:

1. In a switching system,
a plurality of stations,
a source of information,
a register,
control means for establishing a connection between a first one of said stations and said register,
means operative upon the registration of the identity of a requested item of information in said register for enabling said source, and
means activated by said source for switching the connection of said first station from said register to said source to permit transmission of said item of information to said first station.

2. In a switching system,
the combination set forth in claim 1,
wherein said control means comprises means operative during connection of said first station to said information source for establishing a connection between a second one of said stations and said register.

3. In a switching system,
the combination set forth in claim 2 and further comprising means operative upon the release of said information source by said first station for re-enabling said information source and for switching the connection of said second station from said register to said information source to permit transmission of an item of information to said second station.

4. In a switching system,
a plurality of lines,
first and second appearances,
a register,
a trunk,
means for connecting a first one of said lines to said register via said first appearance,
means for transferring the connection of said first line from said register to said trunk and for connecting a second one of said lines to said register via said second appearance, and
means operative upon disconnection of said first line for transferring the connection of said second line from said register to said trunk.

5. In a switching system,
the combination set forth in claim 4 and further comprising
an information source interposed between said register and said trunk, and
means operative in response to the storage in said register of the designation of a requested item of information for activating said information source to transmit said item of information to said trunk.

6. In a telephone system,
a source of information,
means for addressing said source,
means for retrieving information from said source,
means operative in response to receipt of an address by said source from said addressing means for activating said retrieving means, and
means for connecting a pair of lines concurrently to said addressing and retrieving means, respectively, and wherein said
connecting means comprises
means enabled by said activating means for transferring the connection of one line from said addressing means to said retrieving means and for concurrently connecting a second line to said addressing means.

7. In a telephone system ,
the combination set forth in claim 6, wherein said connecting means comprises
means operative upon the disconnection of said one line from said retrieving means for transferring the connection of said second line to said retrieving means.

8. In a telephone switching system,
a plurality of stations,
an information source operative to return an audible reply indicating the status of one of a plurality of items having constantly changing characteristics,
a plurality of registers,
control means for establishing a dial tone connection between a calling one of said stations and a selected register to enable the calling station to cause the registration of the identity of a requested item,
means controlled by said registered identity for enabling said information source, and
switching means for disconnecting said register and for reusing said dial tone connection to return said audible reply to said calling station.

9. The combination set forth in claim 8 wherein said register comprises
means for returning audible ringing tone to said calling station upon said registration of the said requested item identity.

10. In a stock quotation system,
a computer operative to provide output signals indicating the current status of a stock in response to input signals identifying the stock,
a voice-answer-back unit controlled by said output signals for providing an audible manifestation of said stock status,
a switching network,
a station terminated on one side of said network,
a register terminated in a first appearance on the other side of said network, a trunk terminated in a second appearance on said other side of said network, means for establishing a connection between said station and said register via said first appearance, said register comprising means controlled by said station for registering the identity of a requested stock, means controlled by said register for informing said computer of said identity, means responsive to the enabling of said voice-answer-back unit for connecting said voice-answer-back unit to said trunk, and switching means responsive to said connection of said voice-answer-back unit to said trunk for transferring said first appearance from said register to said trunk and means for transferring said second appearance from said trunk to said register.

11. The combination set forth in claim 10 further comprising a plurality of trunks and a plurality of registers wherein each register is associated with a specific trunk which is assigned a unique designation, and each of said registers comprises means for informing said computer of said associated trunk designation.

12. The combination set forth in claim 10 wherein said register comprises two communications conductors and one control conductor, said trunk comprises two communications conductors and one control conductor, said switching means comprises first relay contact means interposed in said register conductors between said first and second appearances and said register, second relay contact means interposed in said trunk conductors between said first and second appearances and said trunk, and third relay contact means controlled by said trunk and said first relay contact means for enabling said second relay contact means.

13. The combination set forth in claim 12 wherein said second relay contact means comprises means for disabling said first relay contact means.

14. In a switching system, a switching network, a plurality of lines connected to said network, a plurality of switching circuits each having a first and a second appearance in said network, a plurality of registers, a plurality of trunks, control means for connecting a first one of said lines to one of said registers via a first appearance of one of said switching circuits.

said one switching circuit comprising means for transferring said register to said second appearance and means for transferring said trunk to said first appearance, said control means further comprising means for connecting a second one of said lines to said register via said second appearance prior to release of said connection of said first line to said trunk via said first appearance, and said switching circuit further comprising means for connecting said associated trunk to said second appearance upon release of said connection of said first line to said trunk via said first appearance.

15. In a switching system, a line, a network appearance operative to convey information signals to and from said line, a register operative to receive said information signals from said line, a trunk operative to transmit said information signals to said line and a switching circuit comprising means for recognizing cessation of signaling from said line and the imminence of signaling to said line, means activated by said recognizing means for causing the disconnection of said register from said appearance and means operative concurrently with said disconnection means for causing the connection of said trunk to said appearance.

16. In a telephone system, a subscriber station, a switching network having a first and a second appearance, register means normally connected to said first appearance, trunk means normally connected to said second appearance, a source of information, means for establishing a signaling connection from said subscriber station through said first appearance and said register means to said information source to interrogate said information source, and means for reversing the normal connections of said register means, trunk means, and first and second appearances to connect said subscriber station through said trunk means and said first appearance to said information source.

References Cited

UNITED STATES PATENTS 3,281,789 10/1966 Willcox et al. ------- 340—152

BERNARD KONICK, *Primary Examiner.*

L. H. HILL, *Assistant Examiner.*